US008861403B2

(12) United States Patent
Tsai et al.

(10) Patent No.: US 8,861,403 B2
(45) Date of Patent: Oct. 14, 2014

(54) INTERCONNECTING SEGMENTED LAYER TWO NETWORK FOR CLOUD SWITCHING

(75) Inventors: Alex Tsai, Cupertino, CA (US); Yibin Yang, San Jose, CA (US); Debashis Patnala Rao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 13/421,572

(22) Filed: Mar. 15, 2012

(65) Prior Publication Data

US 2013/0242757 A1 Sep. 19, 2013

(51) Int. Cl.
*H04L 12/28* (2006.01)
*H04L 12/46* (2006.01)
*H04L 12/44* (2006.01)
*H04L 12/24* (2006.01)

(52) U.S. Cl.
CPC .............. *H04L 12/462* (2013.01); *H04L 12/44* (2013.01); *H04L 41/0803* (2013.01)
USPC .......................................... 370/256; 370/244

(58) Field of Classification Search
CPC .... H04L 12/462; H04L 12/44; H04L 2012/44
USPC ......... 370/244, 254, 255, 256, 400, 401, 407, 370/408
See application file for complete search history.

(56) References Cited

U.S. PATENT DOCUMENTS

| | | | |
|---|---|---|---|
| 6,813,250 B1 | 11/2004 | Fine et al. | |
| 2003/0142680 A1* | 7/2003 | Oguchi | 370/400 |
| 2005/0259597 A1* | 11/2005 | Benedetto et al. | 370/254 |
| 2006/0245376 A1* | 11/2006 | Ge et al. | 370/256 |
| 2008/0089247 A1 | 4/2008 | Sane et al. | |
| 2010/0061246 A1 | 3/2010 | Barnes et al. | |
| 2010/0232435 A1 | 9/2010 | Jabr et al. | |
| 2011/0261828 A1 | 10/2011 | Smith | |
| 2012/0008635 A1* | 1/2012 | Kuo et al. | 370/410 |
| 2012/0327766 A1* | 12/2012 | Tsai et al. | 370/230 |

OTHER PUBLICATIONS

"802.1D™: IEEE Standard for Local and Metropolitan Area Networks—Media Access Control (MAC) Bridges," IEEE Computer Society, Institute of Electrical and Electronics Engineers, Inc., Jun. 9, 2004, pp. 1-281.

(Continued)

*Primary Examiner* — Hoon J Chung
*Assistant Examiner* — Yaotang Wang
(74) *Attorney, Agent, or Firm* — Novak Druce Connolly Bove + Quigg LLP

(57) ABSTRACT

In one embodiment, a layer-2 network that includes a cloud switch is partitioned into a plurality of segments, each segment including one or more cloud switch domains that are coupled via a logical port to a corresponding one of a plurality of internal logical shared media links. One of the internal logical shared media links is provisioned as a hub. One or more remaining internal logical shared media links are defaulted to be spokes. A spanning tree protocol (STP) is executed within each segment. The logical port of each cloud switch domain advertises a pseudo root bridge identifier (ID) to cause the internal logical shared media link to appear attached to a Root. The advertised pseudo root bridge ID of the hub is chosen to have a higher priority than the pseudo root bridge ID of the spokes to establish a hub and spoke relationship among the segments.

19 Claims, 7 Drawing Sheets

(56) References Cited

OTHER PUBLICATIONS

"802.1Q™: IEEE Standard for Local and Metropolitan Area Networks—Media Access Control (MAC) Bridges and Virtual Bridge Local Area Networks," IEEE Computer Society, Institute of Electrical and Electronics Engineers, Inc., Aug. 31, 2011, pp. 1-1365.

"802.1ah™: IEEE Standard for Local and Metropolitan Area Networks—Virtual Bridged Local Area Networks: Amendment 7: Provider Backbone Bridges," IEEE Computer Society, Institute of Electrical and Electronics Engineers, Inc., Aug. 14, 2008, pp. 1-121.

Tallet, F., "A Layer 2 Gateway Port Mechanism," Garden Grove 802.1 IEEE Interim, Cisco Systems, Inc., Sep. 2005, pp. 1-16.

* cited by examiner

INTERCONNECTING SEGMENTED LAYER TWO NETWORK FOR CLOUD SWITCHING

TECHNICAL FIELD

The present disclosure relates generally to cloud switching, and, more particularly, to implementing a spanning tree protocol (STP) enhancement in a cloud switch.

BACKGROUND

Cloud switch architectures may support tens of thousands of external ports coupled to external devices, enabling the formation of massive layer-2 networks. In a typical cloud switch, a fabric interconnect, operating under the control of route processors, is used to couple leaf switches together to form virtual switches. Each virtual switch formed is typically referred to as a cloud switch domain. The interconnect fabric of a cloud switch will typically provide loop-free connections among the leaf switches of the various cloud switch domains. Accordingly, there is generally no need to execute a spanning tree protocol (STP) to break loops internal to a cloud switch. However, this may not be the case for external connections formed between the cloud switch and external devices, for example, legacy bridges. It may be desirable to run a STP to break external loops that may potentially arise from the external connections. Further, it may be desirable to run a STP in such a way that the cloud switch's utilization can be maximized, by promoting traffic to be directed through cloud switch domains rather than through external devices. Likewise, it may be desirable to run a STP in such a way that the impact of topology changes within the network can be limited. While a straightforward approach of executing a STP without changes has been proposed to manage a cloud switch's interaction with external devices, such an approach has a number of shortcomings, including limited scalability, slow convergence, and a propensity to undesirably block certain logical ports internal to the cloud switch. Accordingly there is a need for improved techniques.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

Figure 1:
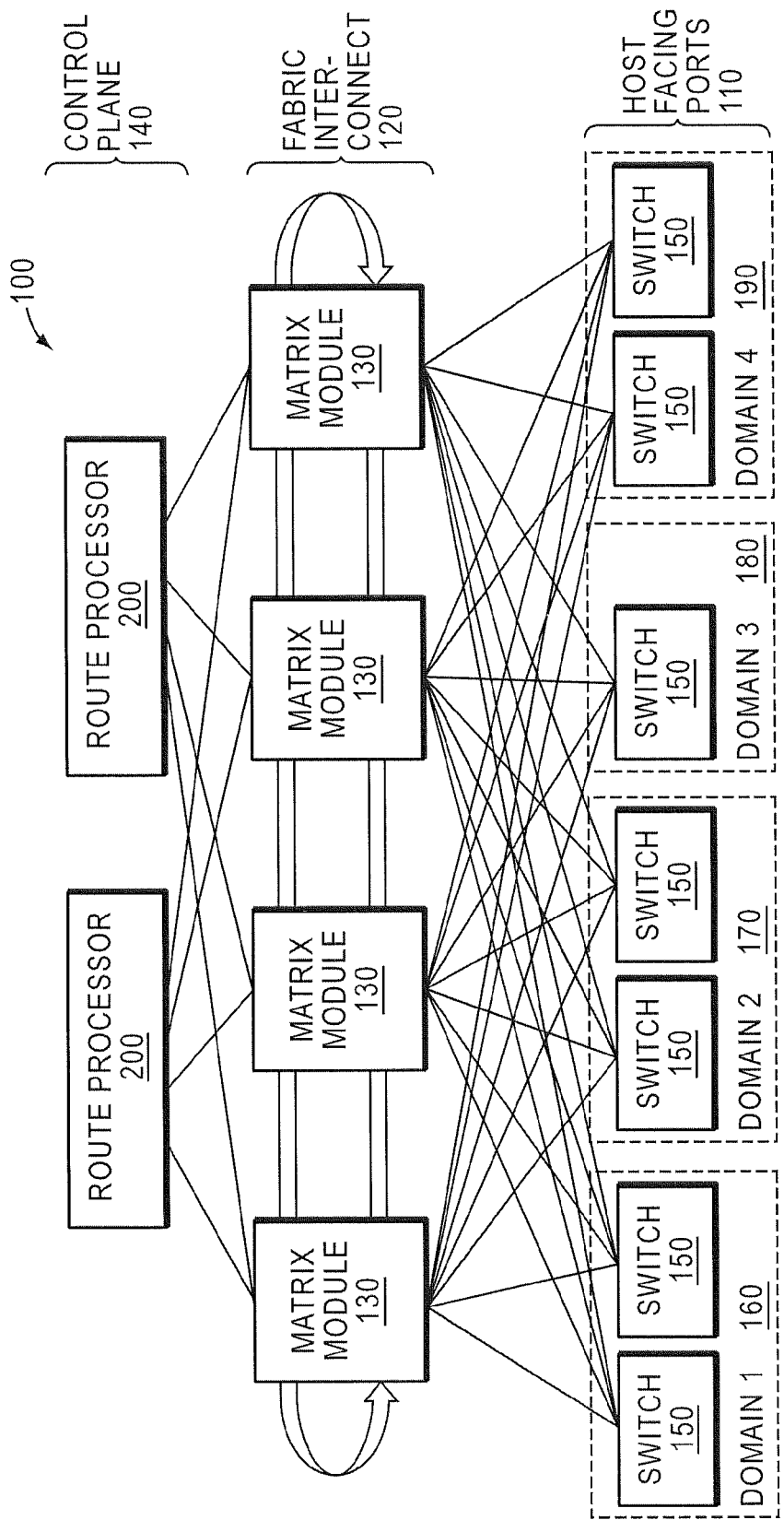
FIG. 1 is a hardware block diagram of an example cloud switch.

According to embodiments of the disclosure, a layer-2 network that includes a cloud switch is partitioned into a plurality of segments, each segment including one or more cloud switch domains that are coupled via a logical port to a corresponding one of a plurality of internal logical shared media links of the cloud switch. One of the plurality of internal logical shared media links is provisioned as a hub internal logical shared media link. One or more remaining internal logical shared media links are defaulted to be spoke internal logical shared media links. A spanning tree protocol (STP) is executed within each segment of the plurality of segments. The logical port of each cloud switch domain advertises a pseudo root bridge identifier (ID) to cause the internal logical shared media link to appear attached to a Root. The advertised pseudo root bridge ID of the hub internal logical shared media link is chosen to have a higher priority than the pseudo root bridge ID of the spoke internal logical shared media links.

Further, in embodiments of the disclosure, external ports of the cloud switch domain coupled to the hub internal logical shared media link are configured as standard ports. Selected external ports of the cloud switch domains coupled to the spoke internal logical shared media links are configured as interconnect ports, while others are configured as standard ports. Interconnect ports and standard ports are transitioned to as errdisable state should the respective ports fail certain tests. Furthermore, a port of the cloud switch domains coupled to each spoke internal logical shared media link is elected as a designated interconnect port (DIP) that is used to pass data frames among segments. Interconnect ports, excluding the DIP, are placed in a discarding state. Still further, propagation of topology change notifications (TCNs) are controlled across segment boundaries according to a number of techniques.

Example Embodiments

A layer-2 network is collection of nodes, such as bridges and switches, interconnected by links that transports data frames using protocols associated with the Data Link Layer of the Open Systems Interconnection (OSI) Reference Model. Layer-2 networks typically provide the ability to establish dedicated point-to-point links between two nodes, as well as to provide shared media links where nodes at least appear to share a common physical media, for example, an Ethernet local area network (LAN). Layer-2 networks generally rely on hardware based address, such a media access control (MAC) addresses from nodes' network interface cards (NICs), to decide where to forward frames. A variety of control protocols may be implemented in layer-2 networks to manage the forwarding of frames. These protocols may include various spanning tree protocols (STPs), such as rapid spanning tree protocol (RSTP) which was standardized in IEEE Std 802.1D-2004 and multiple spanning tree protocol (MSTP) which was standardized in IEEE Std 802.1Q, virtual local area network (VLAN) trunking protocol (VTP), Cisco discovery protocol (CDP), as well as a variety of other protocols.

Since Layer-2 networks often include redundant links, one function of some control protocols, and in particular STPs, is to calculate an active network topology that is loop-free, thereby breaking any loops that may exist in the network. In RSTP, whose operation is illustrative of the class of STPs, ports are assigned port roles that include Root Port role, Designated Port role, Alternate Port role and Backup Port role. They are also assigned port states that include a discarding state, a learning state, and a forwarding state. RSTP elects a single node within the network to be the Root. The election is based on an examination of unique numerical identifiers (bridge IDs) associated with each node. Each bridge ID is composed of a priority value assigned to the node as well as a MAC address of the node. All ports on the Root are assigned Designated Port role. For each non-Root node, the port offering the best (e.g., lowest cost) path to the Root is assigned the Root Port role. For each non-Root node, the port offering an alternative (e.g., higher cost) path to the Root is assigned the Alternate Port role. For each LAN, the one port through which the lowest cost path to the Root is provided to the LAN is assigned the Designated Port role, while other ports through which an alternative (e.g., higher cost) path to the Root is provided may be assigned the Alternate Port role.

Those ports that have been assigned the Root Port role and the Designated Port role are placed in the forwarding state. Further, ports assigned to the Alternate Port role and the Backup Port role are placed in the discarding state. In some cases, ports may be rapidly transitioned between certain states. For example, if a failure occurs on a port currently assigned the Root Port role, a port assigned to the Alternate Port role can be reassigned to the Root Port role and rapidly transitioned to the forwarding state, if certain conditions are met including that the previous Root Port has been transitioned to the discarding state. Other transitions may rapidly occur, if certain conditions are met.

To obtain the information necessary to run RSTP, and other similar STPs, nodes typically exchange special messages commonly referred to as configuration bridge protocol data units (BPDUs). BPDUs carry information, such as an indication of the assumed Root and an indication of lowest root path cost, that may be used by recipient nodes in making port role decisions and, in general, in converging upon a loop-free active topology.

Layer-2 networks are increasingly being deployed in environments that stress their capabilities. For example, a layer-2 network may be called upon to support tens of thousands of devices, such as servers, or tens of thousands of clusters of devices, such as local area networks (LANs) in a data center. To address such architectures, and to provide the performance levels demanded, cloud switch architectures may be deployed. Cloud switches architectures (or simply "cloud switches") typically include a large number of individual switches (referred to herein as "leaf switches") interconnected by a high-speed interconnect and administered collectively as virtual switches. A cloud switch, through its constituent leaf switches, may provide thousands of external ports to support demanding layer-2 networks.

FIG. 1 is a hardware block diagram of an example cloud switch 100. The cloud switch 100 provides an array of host facing ports 110 distributed among a plurality of leaf switches 150. Each leaf switch may be a low latency, nonblocking fixed-configuration switch offering a certain number of (e.g., 48) external ports, to which external devices (e.g., servers) or clusters (e.g., LANs) of external devices may be coupled. The leaf switches 150 are coupled via a fabric interconnect 120 that includes a plurality of matrix modules 130. Each matrix module 130 may, in turn, include switch fabric modules (SFMs) that interconnect to leaf switches 150 via switch interface modules (SIMs). The SFMs and SIMs of the matrix modules 130 operate under the direction of a control plane 140 to provide configurable cell-based forwarding among the leaf switches 150. The control plane 140 includes a plurality of route processors 200. The control plane 140 may organize groups of leaf switches 150 into virtual switches, referred to herein as cloud switch domains. The constituent leaf switches 150 of each cloud switch domain 160-190 operate in a data plane mode under the control of a common control plane for the cloud switch domain.

Figure 2:
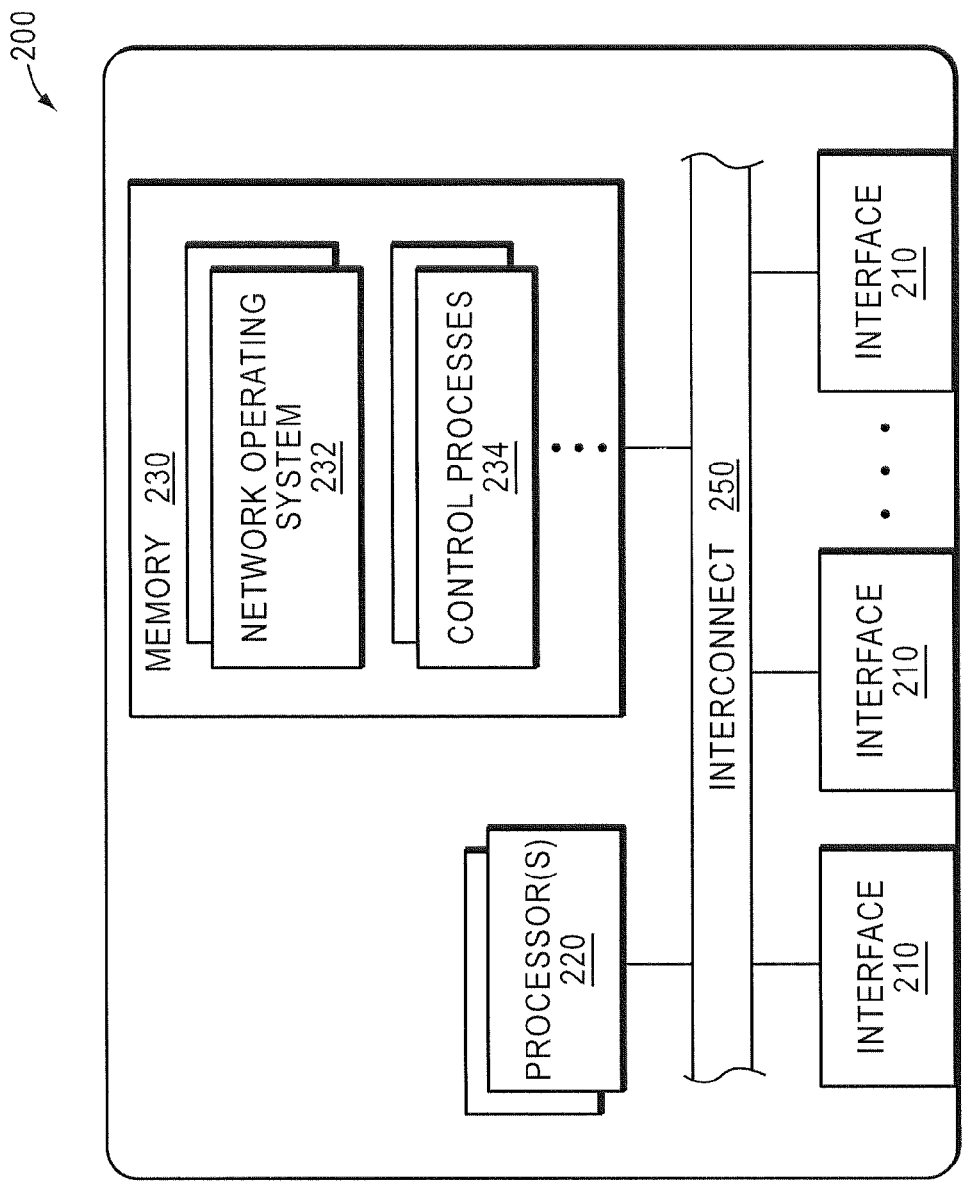
FIG. 2 is a hardware block diagram of an example route processor.

FIG. 2 is a hardware block diagram of an example route processor 200. The route processor 200 includes a plurality of interfaces 210, processor(s) 220, and a memory 230 coupled by interconnect structures (e.g., busses) 250. The interfaces 210 contain mechanical, electrical, and signaling circuitry for connecting to the fabric interconnect 250. The memory 230 includes a plurality of storage locations for storing software and data structures. The processor(s) 220 include logic configured to execute the software and manipulate data from the data structures. A plurality of instances of a network operating system 232 may be stored in the memory and executed by the processor(s) 220 using, for example, hypervisor-based hardware virtualization. Each instance may be associated with a respective cloud switch domain. Similarly, a plurality of instances of control processes 234 may be stored in the memory and executed by the processor(s) 220, each instance again associated with a respective cloud switch domain. The control processes may be portions of the network operating system 232 or separate processes, depending on the particular implementation.

In order to couple cloud switch domains, the cloud switch 100 may implement internal logical shared media links among the cloud switch domains These logical shared media links are referred to herein as "bConnects". The bConnects provide a mechanism for managing both control and data traffic among cloud switch domains of a cloud switch 100. Each cloud switch domain is allowed one and only one logical port that is logically coupled to a particular bConnect of a plurality of bConnects that may exist in the cloud switch 100. Cloud switch domains coupled to the same bConnect are permitted to pass data frames between each other through the fabric interconnect 120. Cloud switch domains that are coupled to different bConnects are prohibited from exchanging data frames with each other through the fabric interconnect 120. They may, however, exchange data flows with each other over external connections (i.e. connections external to the cloud switch 100). Layer-2 control protocols, including CDP and VTP, may be used with, and in some cases implemented over, bConnects.

Figure 3:
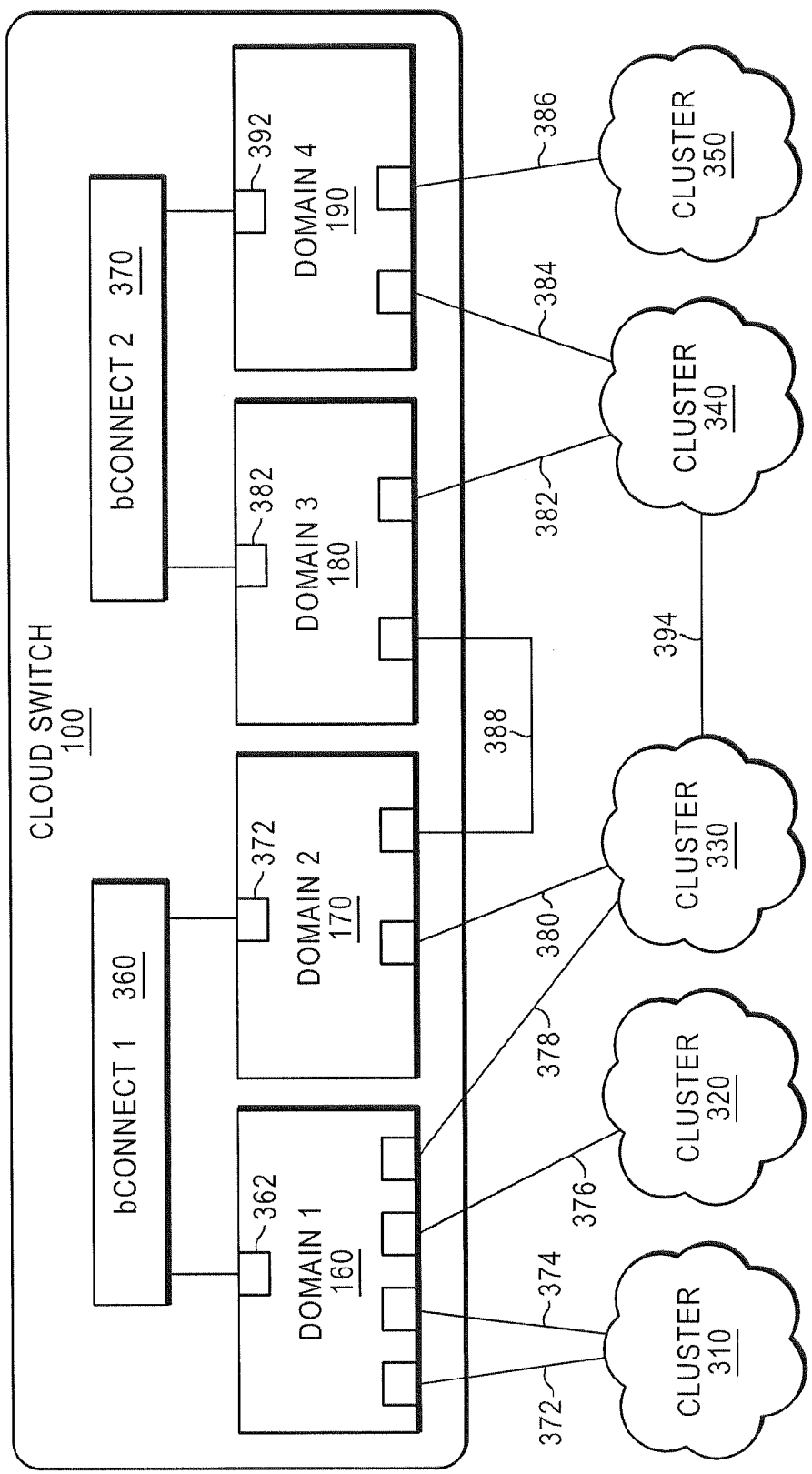
FIG. 3 is a logical block diagram of an example cloud switch connected to a plurality of clusters of external devices, showing internal logical shared media links (referred to herein as bConnects) among certain of the cloud switch domains.

FIG. 3 is a logical block diagram of an example cloud switch 100 connected to a plurality of clusters 310-350 of external devices, showing internal logical shared media links (bConnects) 360, 370 among certain of the cloud switch domains 160-190. Each cluster 310-350 of external devices may include a number of legacy bridges, switches, servers, and other devices, that are coupled to the leaf switches (not shown in FIG. 3) of a respective cloud switch domain 160-190 by links 372-386. Certain cloud switch domains 170, 180 may be coupled directly to each other by a link 388 that is external to the cloud switch 100, providing direct external connectivity among the cloud switch domains. Similarly, certain clusters 330, 340 may be coupled to each other by a link 394 that is external to the cloud switch 100, providing indirect external connectivity among the cloud switch domains. In such manner external connectivity may be provided between the bConnects.

In this example, a first cloud switch domain 160 and a second cloud switch domain 170 are coupled to a first bConnect 360 by respective logical ports 362, 372. As such, the first cloud switch domain 160 and the second cloud switch domain 170 are permitted to pass data frames between each other through the fabric interconnect 120 of the cloud switch 100.

Similarly, a third cloud switch domain 180 and a fourth cloud switch domain 190 are coupled to a second bConnect 370 by respective logical ports 382, 392. As such, the third cloud switch domain 180 and the fourth cloud switch domain 190 are permitted to pass data frames between each other through the fabric interconnect 120 of the cloud switch 100.

In such an arrangement, the fabric interconnect 120 of the cloud switch 100 may provide a loop-free connection among the first cloud switch domain 160 and the second cloud switch domain 170, and among the third cloud switch domain 180 and the fourth cloud switch domain 190. Accordingly, there may be no need to execute a STP to break loops within the cloud switch 100. However, the clusters 310-350, and certain external links 388, may introduce external loops, where a path external to the cloud switch may allow frames to circle back. For example, a loop may be introduced by the presence of redundant links 372, 374 to cluster 310, by the presence of links 378, 380 to cluster 330, by the presence of links 382, 384 to cluster 340, by the presence of external link 388, etc.

While one could attempt to break these external loops by executing a traditional STP across all the clusters 310-350, cloud switch domains 150-190 and bConnects 360,370, in effect creating a large, flat layer-2 network, such an approach has a number of shortcomings. In such a larger, flat layer-2 network, the STP may happen to place the logical ports 362, 372, 382, 392 leading to the bConnects 360, 370 in a discarding state. If this occurs, a cloud switching domain 160-190 may be severed from its respective bConnect 360, 370. This is highly undesirable, as it would force traffic to flow over external connections rather than through the cloud switch 100, which typically can offer much better performance. Further, such a larger, flat layer-2 network may converge slowly, since bConnects 360, 370, by definition, operate as shared media links. Rapid synch techniques offered by many STPs are typically only applicable to point-to-point links, and not shared media links, and therefore may not be compatible with bConnects 360, 370. Finally, such a larger, flat layer-2 network may stress the STP beyond its scaling capabilities. The sheer size of the layer-2 network may cause aspects of the STP, which function perfectly adequately in smaller networks, to become untenable.

According to one embodiment of the present disclosure, these and other shortcomings are addressed by a partitioning a layer-2 network including a cloud switch 100 into "segments" and managing the execution of STP over these segments by causing it to appear that bConnects are attached to the Root (a pseudo Root). Each "segment" includes the cloud switch domains coupled to a same bConnect and their externally connected devices. Within each segment, nodes run a STP, for example, a traditional RSTP or MSTP. However, rather than leave Root selection to chance, the bConnect of each segment is caused by the control processes 234 to appear attached to the Root (a pseudo Root) of the respective segment. The logical ports of all cloud switch domains in a segment generate BPDUs that advertise a same pseudo root bridge ID, which has higher priority than other bridge IDs, to promote the bConnect of each segment to appear attached to the Root (the pseudo Root).

Further, hierarchy is established among the bConnects. bConnects are categorized into two types: hub and spoke. One bConnect is configured as a hub bConnect, and its associated segment treated as a hub segment. The hub segment provides transit for inter-segment traffic, and preferably includes cloud switch domains having high switching capacity. The remaining bConnects are configured as spoke bConnects, and their associated segments are treated as spoke segments. The cloud switch domains of spoke segments operate as sources and sinks of inter-segment traffic. The logical ports in the hub segment coupled to the hub bConnect are caused, for example by the control processes 234, to advertise a pseudo root bridge ID having a higher priority than that of the pseudo root bridge ID advertised by the logical ports in the spoke segments coupled to the spoke bConnects. In such manner, a hub and spoke relationship is established among the segments and, more specifically, among the bConnects.

Figure 4:
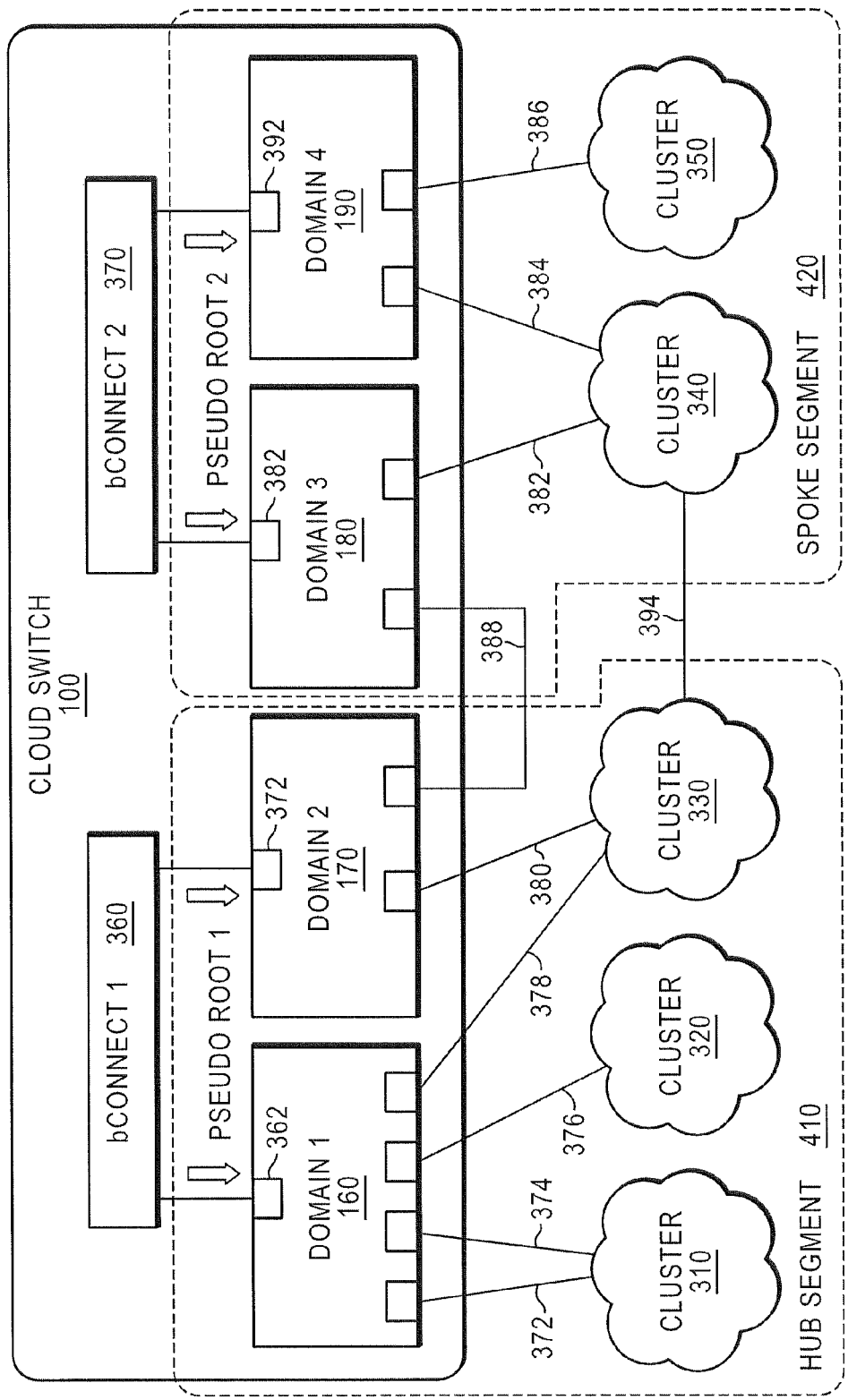
FIG. 4 is a logical block diagram of an example cloud switch depicting the partitioning of the layer-2 network into segments.

FIG. 4 is a logical block diagram of an example cloud switch 100 depicting the partitioning of the layer-2 network into segments. In this example, the first bConnect 360 is configured as the hub bConnect, for example, through provisioning by a user, and is associated with a hub segment 410. The second bConnect 370 is configured as a spoke bConnect, for example, by a default rule that all bConnects are initially treated as spoke bConnects, and is associated with a spoke segment 420. The first bConnect (the hub bConnect) 360 is treated as attached to a first pseudo Root, and the second bConnect (the hub bConnect) 370 is treated as attached to a second pseudo Root. The logical ports 362, 372 coupled to the first bConnect (the hub bConnect) 360 advertise a first pseudo root bridge ID, while the logical ports 382, 392 coupled to the second bConnect (the spoke bConnect) 370 advertise a second pseudo root bridge ID. The first pseudo root bridge ID is chosen to include a higher priority than the second pseudo root bridge ID, to thereby establish a huh-and-spoke relationship among the segments.

External ports of cloud switch domains (i.e., ports coupled to devices external to the cloud switch) are categorized into two types: standard and interconnect. A standard port conducts typical STP (e.g., RSTP or MSTP) interactions with the external device attached thereto, sending out BPDUs with the pseudo root bridge ID associated with the bConnect of the respective segment and receiving BPDUs from the external device. An interconnect port is specially designated to carry inter-segment traffic, and refrains from STP (e.g., RSTP or MSTP) interactions with the external device attached thereto. In particular an interconnect port does not send out BPDUs, and, as explained below, after certain checking is performed may drop any received BPDUs. All external ports of cloud switch domains within the hub segment are configured as standard ports. Selected external ports of cloud switch domains within the spoke segments may be configured as interconnect ports, for example, through user provisioning, while the remaining may be treated as standard ports by default.

A check may be performed to ensure that a standard port will not be used for inter-segment connectivity. If a standard port of a cloud switch domain receives a BPDU having a root bridge ID with a higher priority than the pseudo root bridge ID advertised by the logical port that couples the cloud switch domain to its bConnect, thereby indicating the standard port may offer a path to another bConnect, the standard port is transitioned to an error-disabled ("errdisable") state. The errdisable state is a special state where a port is disabled automatically due to an error condition being encountered on the port. Otherwise, a BPDU received on a standard port is processed according to the STP (e.g., RSTP or MSTP) used within the segment.

Further, a check may be performed to ensure an interconnect port actually provides a path to the hub bConnect. If an interconnect port receives a BPDU indicating a root bridge ID that is different than the pseudo root bridge ID associated with the hub bConnect (whose value may be obtained through an inter-process communication or another out-of-band mechanism within the cloud switch 100), the port is transitioned to an errdisable state. Provided this check does not cause the port to be errdisabled, any BPDU subsequently received on an interconnect port may be dropped, to confine the scope of STP (e.g., RSTP or MSTP) to be within each segment.

To provide multipath redundancy, multiple interconnect ports of a spoke segment (i.e., of cloud switch domains coupled to a spoke bConnect) may be coupled to other segment's (i.e. to cloud switch domains of another bConnect). One of these interconnect ports is elected as a designated interconnect port (DIP) indicating it should be placed in a forwarding state (unblocked) and used to pass frames among the segments. Other of these interconnect ports are initially placed in a discarding (blocked) state. One or more of the blocked interconnect ports may be elected as backup designated interconnect ports (BDIPs) indicating they may be transitioned to become the DIP if the original DIP is taken out of service (e.g., fails). The DIP election may be performed by a DIP election algorithm of the control processes 234, that performs an exchange and comparison of interconnect port information, for example, of port priority. The election of a DIP ensures that each spoke bConnect can only have one path to the hub bConnect through the DIP of the spoke segment associated with the spoke bConnect. In some cases, this one path to the hub bConnect is specific to a VLAN. As a refinement to facilitate load balancing, DIP election can be made VLAN specific, switching traffic for a group of VLANs only. In such a case, multiple DIPs can be elected for one bConnect to carry traffic for all the VLANs, each DIP corresponding to a respective group of VLANs.

To limit the propagation of topology change information, and thereby avoid network churn, many types of topology changes are not propagated across segment boundaries. For example, topology change notifications (TCNs) regarding topology changes internal to a segment are typically not propagated across segment boundaries. In contrast, TCNs regarding a change of a DIP of a spoke segment may be propagated "upstream", i.e. toward the hub segment associated with the hub bConnect, and may or may not, depending on the circumstances, be propagated "downstream", i.e. toward other cloud switch domains of the spoke segment whose DIP changed. If the DIP is being changed to another port that resides in the same cloud switch domain as the original DIP, no downstream TCNs are propagated. Conversely, if the DIP is being changed to another port that resides in a different cloud switch domain than the original DIP, downstream TCNs are propagated. TCNs regarding a change of a DIP are not propagated to cloud switch domains of spoke segments other than the spoke segment whose DIP changed. In some implementations, DIP election may include a preference for BDIPs in the same cloud switch domain as the original DIP, in order to minimize the occasions when downstream TCNs are sent.

Figure 5:
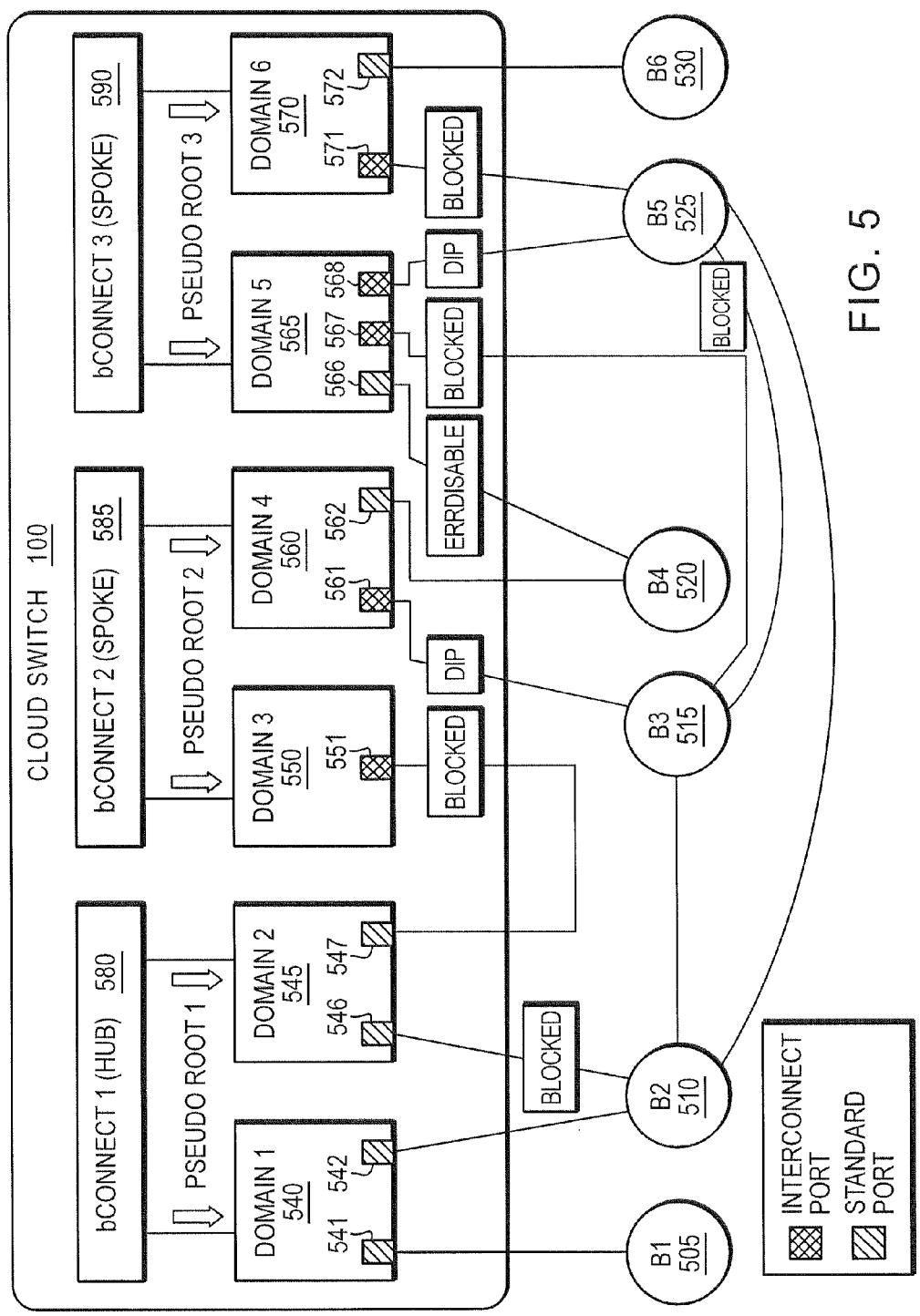
FIG. 5 is a logical block diagram of an example cloud switch depicting aspects of the treatment of external ports.

FIG. 5 is logical block diagram of an example cloud switch 100, depicting aspects of the treatment of external ports. In this example, a first bConnect 580 is configured as the hub bConnect, and a second bConnects 585 and a third bConnect 590 are each configured as spoke bConnects. A first cloud switch domain 540 and a second cloud domain 545 of the first bConnect (hub bConnect) 580 have external ports 541, 542, 546 coupled to a first legacy bridge 505 and a second legacy bridge 510, as well as an external port 547 coupled to a link that lead directly to a third cloud switch domain 550. The legacy bridges may be network bridges that have no knowledge of the inner operations of the cloud switch 100. The third cloud switch domain 550 and a fourth cloud switch domain 560 of the second bConnect (spoke bConnect) 585 have external ports 561, 562 coupled to a third legacy bridge 515 and a fourth legacy bridge 520, as well as an external port 551 coupled to the link that leads directly to the second cloud switch domain 545. Similarly, a fifth cloud switch domain 565 and a sixth cloud switch domain 570 of the third bConnect (spoke bConnect) 590 have external ports 566, 567, 568, 571, 572 coupled to the fourth legacy bridge 520, the third legacy bridge 515, a fifth legacy bridge 525 and a sixth legacy bridge 530. All external ports 541, 542, 546, 547 of the first bConnect (the hub bConnect) 580 are configured as standard ports, while selected external ports 551, 561, 567, 568, 571 of the second bConnect 585 and third bConnect 590 (the spoke bConnects) are configured as interconnect ports, with the remaining external ports 562, 566, 572 of the spoke bConnects 585, 590 configured as standard ports.

Where cloud switch domains of a spoke bConnect (i.e. cloud switch domains within a spoke segment) have multiple interconnect ports, one of these interconnect ports is elected DIP and transitioned to a forwarding state (i.e. unblocked). The remaining ports of the cloud switch domains of a spoke bConnect (i.e. cloud switch domains within a spoke segment) are transitioned to a discarding state (i.e. blocked). For example, with the two interconnect ports 551, 561 of the third cloud switch domain 550 and the fourth cloud switch domain 560 of the second bConnect (spoke bConnect) 585, interconnect port 561 is elected DIP and interconnect port 551 is blocked. Similarly, with the three interconnect ports 567, 568, 571 of the fifth cloud switch domain 565 and the sixth cloud switch domain 570 of the third bConnect (spoke bConnect) 590, interconnect port 568 is elected DIP and interconnect ports 567 and 571 are blocked.

When multiple standard ports of domains attached to different bConnects are connected, possibly via a legacy bridge, for example ports 562 and 566 interconnected to the fourth legacy bridge 520, one of the ports is automatically transitioned to an errdisable state based on the priority indicated in the root bridge ID in received BPDUs. For example, port 566 of the fifth cloud switch domain 565 is automatically transitioned to an errdisable state once it receives a BPDU from the fourth cloud switch domain 560 with a pseudo root bridge ID having a higher priority than that of the pseudo root bridge ID of the third bConnect 590.

If, by mistake, a user were to configure an external port coupled to a legacy bridge as an interconnect port, when it actually does not provide a path to the hub bConnect 580, such port will also be automatically transitioned to an errdisable state. For example, if, by mistake, a user configured port 572 of the sixth cloud switch domain, coupled to the sixth legacy bridge 530, as an interconnect port, it will be automatically transitioned to an errdisable state, since the root bridge ID in BPDUs sent from the sixth legacy bridge 530 would not match the pseudo root bridge ID of the hub bConnect 580.

If a DIP changes, TCNs are be generated and propagated "upstream" and, in some circumstances, "downstream". For example, if interconnect port 568, which originally serves as the DIP for the cloud switch domains 565, 570 coupled to the third bConnect 590, is taken out of service (e.g., fails), and interconnect port 567 coupled to the third legacy bridge 515 is elected DIP. TCNs may be sent upstream via the third legacy bridge 515. However, in these circumstances no TCNs may be sent downstream to the sixth cloud switch domain 570 or the sixth legacy bridge 530.

Figure 6:
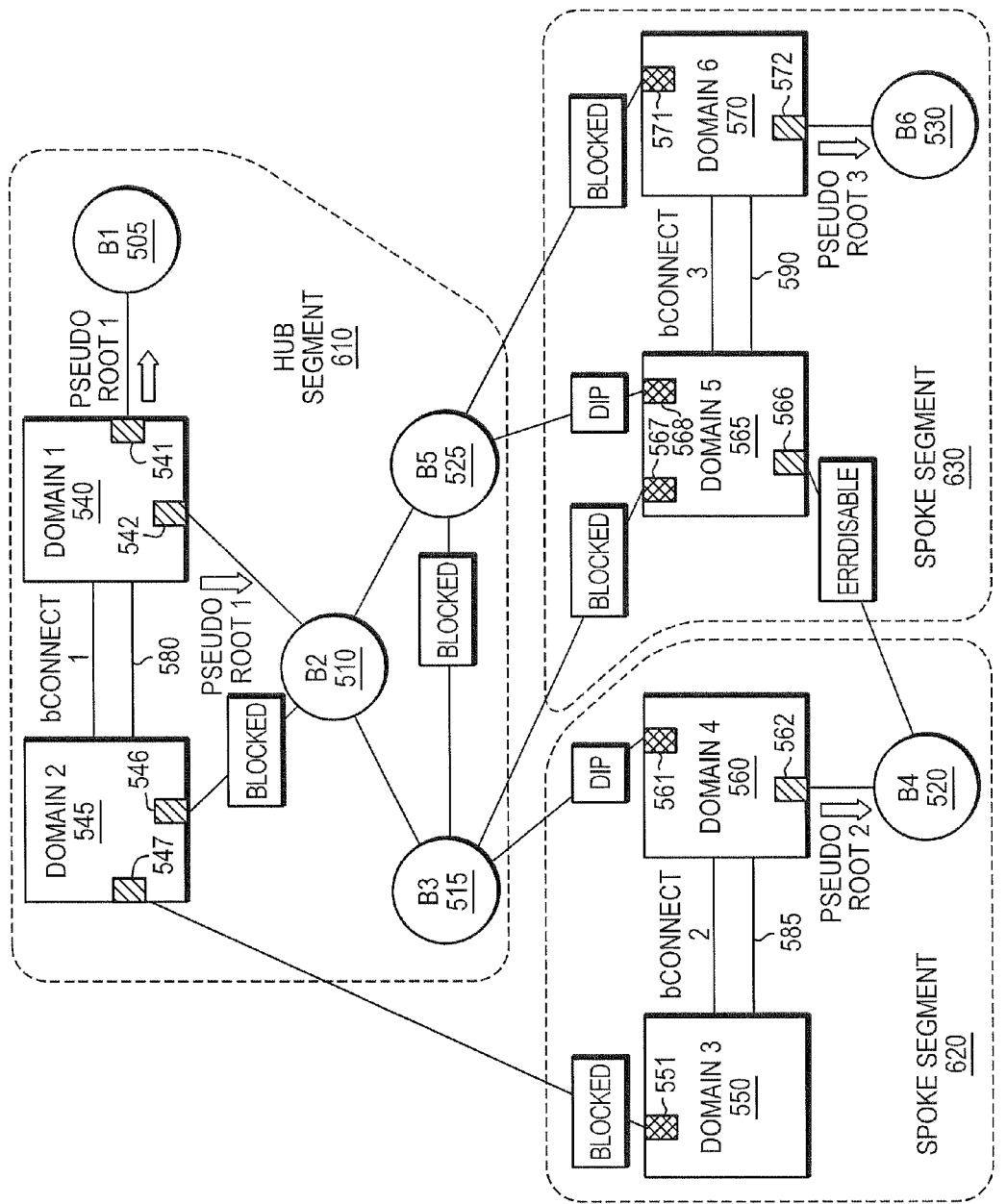
FIG. 6 is a logical block diagram of the configuration shown in FIG. 5, rearranged to better illustrate inter-segment connectivity.

FIG. 6 is a logical block diagram of the configuration shown in FIG. 5, rearranged to better illustrate inter-segment connectivity. As illustrated in FIG. 6, each spoke segment 620, 630 associated with the spoke bConnects 585, 590 is coupled to the hub segment 610 associated with the hub bConnect 590 by interconnect ports, one of which is elected DIP. The above description presented in relation to FIG. 5 is equally applicable to the rearranged presentation of the configuration shown in FIG. 6

Figure 7:
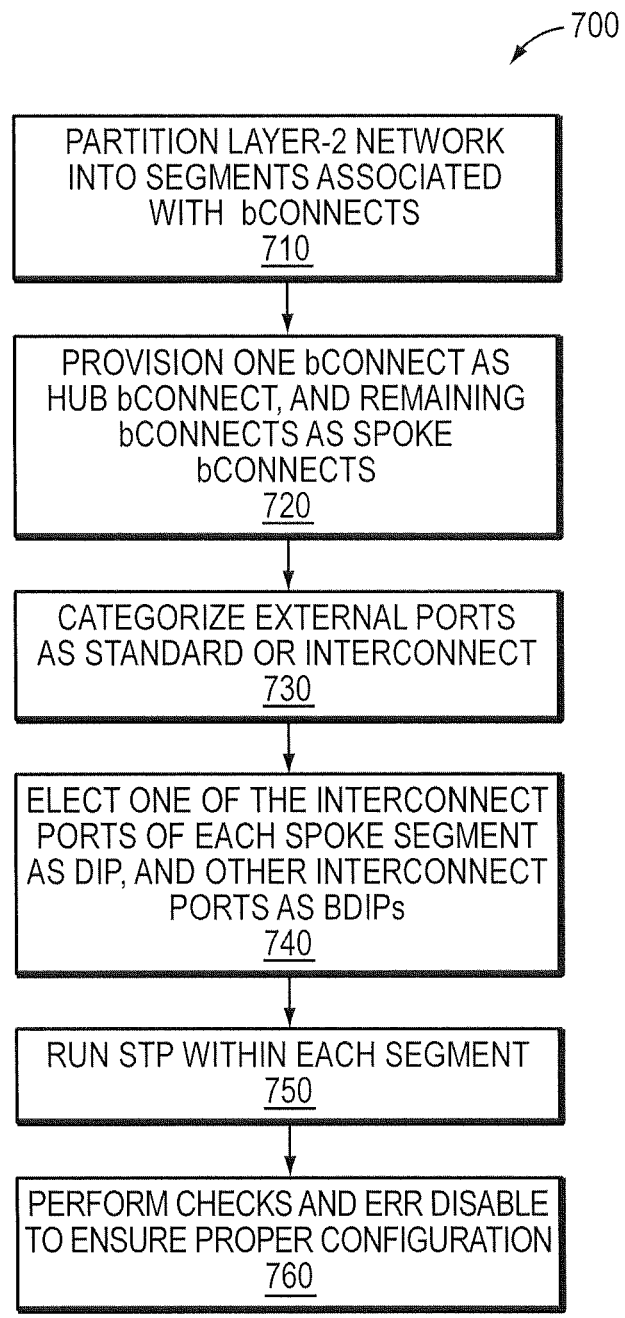
FIG. 7 is a flow diagram of an example sequence of steps for managing a layer-2 network including a cloud switch using segments.

FIG. 7 is a flow diagram of an example sequence of steps 700 for managing a layer-2 network including a cloud switch 100 using segments. At step 710, control processes 234 partition the layer-2 network including the cloud switch 100 into multiple segments, each of which includes the cloud switch domains coupled to an internal logical shared media link (bConnect) of the cloud switch 100, and their externally connected devices. At step 720, in response to, for example, a user selection, one of the bConnects is configured as a hub bConnect and its associated segment treated as a hub segment. The remaining bConnects are configured as spoke bConnects (e.g., by default), and their associated segments treated as spoke segments.

At step 730, external ports of the cloud switch domains of the segments are categorized as standard or interconnect. All external ports of the cloud switch domains within the hub segment are configured as standard ports by the control processes 234. Selected (e.g., user selected) external ports of cloud switch domains within the spoke segments are configured as interconnect ports by the control processes 234, while remaining ports are configured as standard ports.

At step 740, a DIP election algorithm implemented by the control processes 234 elects one of the interconnect ports of each spoke segment as a DIP and it is placed in a forwarding state (i.e. unblocked) and used to pass data frames among segments. Other interconnect ports of spoke segments are placed in the discarding state (i.e. blocked). Some of the other interconnect ports may be elected BDIPs. At step 750, a STP (e.g., RSTP or MSTP) is run within each segment. The control processes 234 causes the logical ports coupled to the bConnects to advertise a pseudo root bridge ID for the respective bConnect to cause it to appear attached to a Root (pseudo Root). The advertised pseudo root bridge ID of the hub bConnects is chosen to have a higher priority than the pseudo root bridge ID of the spoke bConnects, to thereby establish a hub and spoke relationship among the segments associated with the bConnects.

At step 760, various checks are performed in response to BPDUs received on external ports. For example, a check is performed to ensure a standard port will not be used for inter-segment connectivity, a check is performed to ensure an interconnect port actually provides a path to the hub bConnect, etc. External ports which fail the checks are transitioned to an errdisable state.

In summary, the present disclosure provides a technique for managing a layer-2 network including a cloud switch using segments and for managing the execution of STP over these segments by promoting bConnects to be treated as attached to pseudo Roots. It should be understood that various adaptations and modifications may be made within the spirit and scope of the embodiments herein. For example, at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc.

Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
partitioning a layer-2 network that includes a cloud switch into a plurality of segments, each segment including one or more cloud switch domains that are coupled via a logical port to a corresponding one of a plurality of internal logical shared media links of the cloud switch;
provisioning one of the plurality of internal logical shared media links as a hub internal logical shared media link and one or more remaining internal logical shared media links as spoke internal logical shared media links;
executing a spanning tree protocol (STP) within each segment of the plurality of segments, the logical port of each cloud switch domain to advertise a pseudo root bridge identifier (ID) for the internal logical shared media link coupled thereto during execution of the STP to cause the internal logical shared media link to appear attached to a Root, the advertised pseudo root bridge ID of the hub internal logical shared media link to have a higher priority than the pseudo root bridge ID of the spoke internal logical shared media links to establish a hub and spoke relationship among the segments;
electing a port of the cloud switch domains coupled to each spoke internal logical shared media link as a designated interconnect port (DIP); and
if the DIP of the cloud switch domains coupled to a particular spoke internal logical shared media link is changed, propagating topology change notification (TCNs) to the cloud switch domains coupled to the hub internal logical shared media link;
wherein one of the plurality of segments is associated with the hub internal logical shared media link as a hub segment and one or more other segments of the plurality of segments are associated with the spoke internal logical shared media links as spoke segments.

2. The method of claim 1, further comprising:
configuring external ports of the cloud switch domain coupled to the hub internal logical shared media link as standard ports, wherein a standard port sends configuration bridge protocol data units (BPDUs) to, and processes received BPDUs from, external devices.

3. The method of claim 1, further comprising:
configuring selected external ports of the cloud switch domains coupled to the spoke internal logical shared media links as interconnect ports, wherein an interconnect port does not send configuration bridge protocol data units (BPDUs) to, and drops received BPDUs from, external devices.

4. The method of claim 3, wherein the configuring is in response to user selection of interconnect ports.

5. The method of claim 3, further comprising:
checking if an interconnect port receives a BPDU indicating a root bridge ID that is different than the pseudo root bridge ID associated with the hub internal logical shared media link, and if so, transitioning the interconnect port to an errdisable state.

6. The method of claim 3, further comprising:
configuring external ports of the cloud switch domains coupled to the spoke internal logical shared media links other than the selected external ports as standard ports, wherein a standard port sends BPDUs to, and processes received BPDUs from, external devices.

7. The method of claim 6, further comprising:
checking if a standard port receives a BPDU indicating a root bridge ID that indicates a root bridge ID having a higher priority than the pseudo root bridge ID associated with the hub internal logical shared media link, and if so, transitioning the standard port to an errdisable state.

8. The method of claim 1, further comprising:
electing a port of the cloud switch domains coupled to each spoke internal logical shared media link as a designated interconnect port (DIP) that is used to pass data frames among segments and placing the DIP in a forwarding state.

9. The method of claim 8, wherein the DIP is virtual local area network (VLAN) specific, and multiple ports of the cloud switch domains coupled to each spoke internal logical shared media link are elected DIPs, each such port for a different group of VLANs.

10. The method of claim 1, further comprising:
electing one or more ports of the cloud switch domains coupled to each spoke internal logical shared media link as a backup designated interconnect port (BDIP).

11. The method of claim 10, further comprising:
placing interconnect ports, including the one or more BDIPs but excluding the DIP, in a discarding state.

12. The method of claim 1, further comprising:
if the DIP of the cloud switch domains coupled to the particular spoke internal logical shared media link is changed, and an original DIP and a new DIP reside in the same cloud switch domain, preventing propagation of the TCNs to cloud switch domains coupled to the same spoke internal logical shared media link
if the DIP of the cloud switch domains coupled to the particular spoke internal logical shared media link is changed, and the original DIP and the new DIP reside different cloud switch domains, propagating the TCNs to cloud switch domains coupled to the same spoke internal logical shared media link.

13. The method of claim 1, wherein the configuring is in response to a user selecting one of the plurality of internal logical shared media links as the hub internal logical shared media link.

14. An apparatus, comprising:
one or more processors configured to execute one or more software processes; and
one or more memories configured to store software processes including a control process, which are executable by the processors, the control process when executed operable to:
partition a layer-2 network that includes a cloud switch into a plurality of segments, each segment including one or more cloud switch domains that are coupled via a logical port to a corresponding one of a plurality of internal logical shared media links of the cloud switch,
provision one of the plurality of internal logical shared media links as a hub internal logical shared media link and one or more remaining internal logical shared media links as spoke internal logical shared media links,
execute a spanning tree protocol (STP) within each segment of the plurality of segments, the logical port of each cloud switch domain to advertise a pseudo root bridge identifier (ID) for the internal logical shared media link coupled thereto during execution of the STP to cause the internal logical shared media link to appear attached to a Root, the advertised pseudo root bridge ID of the hub internal logical shared media link chosen to have a higher priority than the pseudo root bridge ID of the spoke internal logical shared media links to establish a hub and spoke relationship among the segments;
elect a port of the cloud switch domains coupled to each spoke internal logical shared media link as a designated interconnect port (DIP); and
if the DIP of the cloud switch domains coupled to a particular spoke internal logical shared media link is changed, propagate topology change notification (TCNs) to the cloud switch domains coupled to the hub internal logical shared media link:,
wherein one of the plurality of segments is associated with the hub internal logical shared media link as a hub segment and one or more other segments of the plurality of segments are associated with the spoke internal logical shared media links as spoke segments.

15. The apparatus of claim 14, wherein the control process when executed is further operable to configure external ports of the cloud switch domain coupled to the hub internal logical shared media link as standard ports, wherein a standard port sends configuration bridge protocol data units (BPDUs) to, and processes received BPDUs from, external devices, and configure selected external ports of the cloud switch domains coupled to the spoke internal logical shared media links as interconnect ports, wherein an interconnect port does not send BPDUs to, and drops received BPDUs from, external devices.

16. The apparatus of claim 15, wherein the control process when executed is further operable to configure external ports of the cloud switch domains coupled to the spoke internal logical shared media links other than the selected external ports as standard ports.

17. The apparatus of claim 14, wherein the control process when executed is further operable to elect an interconnect port of the cloud switch domains coupled to each spoke internal logical shared media links as a designated interconnect port (DIP) that is used to pass data frames among segments.

18. The apparatus of claim 17, wherein the control process when executed is further operable to elect one or more interconnect ports of the cloud switch domains coupled to each spoke internal logical shared media link as a backup designated interconnect port (BDIP).

19. An apparatus comprising:
means for partitioning a layer-2 network that includes a cloud switch into a plurality of segments, each segment including one or more cloud switch domains that are coupled via a logical port to a corresponding one of a plurality of internal logical shared media links of the cloud switch;
means for provisioning one of the plurality of internal logical shared media links as a hub internal logical shared media link and remaining internal logical shared media links as spoke internal logical shared media links;
means for executing a spanning tree protocol (STP) within each segment of the plurality of segments, the STP to attach the internal logical shared media link of each segment to a Root in response to an advertised pseudo root bridge identifier (ID) and to establish a hub and spoke relationship among the segments;
means for electing a port of the cloud switch domains coupled to each spoke internal logical shared media link as a designated interconnect port (DIP); and
if the DIP of the cloud switch domains coupled to a particular spoke internal logical shared media link is changed, means for propagating topology change notification (TCNs) to the cloud switch domains coupled to the hub internal logical shared media link:,
wherein one of the plurality of segments is associated with the hub internal logical shared media link as a hub segment and one or more other segments of the plurality of segments are associated with the spoke internal logical shared media links as spoke segments.

* * * * *